United States Patent
Jorgensen et al.

(10) Patent No.: US 9,488,058 B2
(45) Date of Patent: Nov. 8, 2016

(54) BUCKET CONNECTION FOR A TURBINE RUNNER

(71) Applicant: Dynavec AS, Vanvikan (NO)

(72) Inventors: Hans Jorgen Jorgensen, Tiller (NO); Are Johan Simonsen, Trondheim (NO)

(73) Assignee: Dynavec AS (NO)

( * ) Notice: Subject to any disclaimer, the term of this patent is extended or adjusted under 35 U.S.C. 154(b) by 390 days.

(21) Appl. No.: 14/349,879

(22) PCT Filed: Oct. 3, 2012

(86) PCT No.: PCT/NO2012/050189
§ 371 (c)(1),
(2) Date: Apr. 4, 2014

(87) PCT Pub. No.: WO2013/051942
PCT Pub. Date: Apr. 11, 2013

(65) Prior Publication Data
US 2014/0255195 A1    Sep. 11, 2014

(30) Foreign Application Priority Data

Oct. 4, 2011 (NO) ................................. 20111347
Sep. 25, 2012 (NO) ................................. 20121084

(51) Int. Cl.
*F03B 1/02* (2006.01)
*F01D 5/22* (2006.01)

(52) U.S. Cl.
CPC . *F01D 5/22* (2013.01); *F03B 1/02* (2013.01); *Y02E 10/223* (2013.01)

(58) Field of Classification Search
CPC .......... F01D 5/22; F01D 5/30; F01D 5/3007; F01D 5/3053; F03B 1/02; Y02E 10/223
USPC ....................................................... 416/197 B
See application file for complete search history.

(56) References Cited

U.S. PATENT DOCUMENTS

| 651,101 | A | * | 6/1900 | Brown ....................... F03B 1/02 |
| | | | | 416/197 B |
| 1,661,872 | A | | 3/1928 | Branington |

(Continued)

FOREIGN PATENT DOCUMENTS

| CH | 159487 A * 1/1933 ................ F03B 1/02 |
| EP | 0 902 183 A1   3/1999 |

(Continued)

OTHER PUBLICATIONS

International Search Report issued in connection with PCT/NO2012/050189, (Dec. 3, 2012).

(Continued)

*Primary Examiner* — Jessica Cahill
(74) *Attorney, Agent, or Firm* — Akerman LLP

(57) ABSTRACT

A bucket connection for a turbine runner that includes a number of buckets encircling a centre disk. At least one bucket is pivotably or hingedly connected to the centre disk, and the position of the bucket relative to the centre disk under operation is set by an abutment between the bucket and a support, where the support is connected to or constitutes a part of the centre disk and where the abutment is constituted by a non-planar abutment surface on the support and an abutment surface on the bucket The bucket connection is provided with a buckling and is the abutment surface of the bucket is provided with a buckling adapted to fit into the buckling of the abutment surface of the support, whereby the abutment is adapted to accommodate forces acting both tangentially and radially of the bucket.

5 Claims, 3 Drawing Sheets

(56) References Cited

U.S. PATENT DOCUMENTS

| | | |
|---|---|---|
| 6,443,697 B1 | 9/2002 | Rossi et al. |
| 6,885,114 B2 * | 4/2005 | Baarman ............... C02F 1/325 |
| | | 239/265.11 |
| D531,957 S * | 11/2006 | Baarman ................... D13/122 |

FOREIGN PATENT DOCUMENTS

| | | | |
|---|---|---|---|
| EP | 2 365 209 A2 | 9/2011 | |
| FR | 2922967 A1 * | 5/2009 | ............... F03B 1/02 |
| GB | 583291 A * | 12/1946 | ............... F03B 1/02 |
| NO | 322857 B1 | 12/2006 | |
| WO | 2010/024686 A1 | 3/2010 | |

OTHER PUBLICATIONS

Written Opinion of the International Searching Authority issued in connection with PCT/NO2012/050189, (Dec. 3, 2012).

* cited by examiner

BUCKET CONNECTION FOR A TURBINE RUNNER

This application is a national phase of PCT/NO2012/050189, filed Oct. 3, 2012, and claims priority to No. 20111347, filed Oct. 4, 2011 and No. 20121084, filed Sep. 25, 2012, the entire contents of all of which are hereby incorporated by reference.

There is provided a bucket connection for a turbine runner. More precisely there is provided a bucket connection for a turbine runner where the turbine includes a number of buckets encircling a centre disk.

This invention primarily relates to turbine runners of the pelton type where a centre disk mounted on a shaft has a number of cup shaped blades, called buckets, distributed around the centre disk. One or more jets of pressurized water act on the buckets.

Traditionally such buckets have been fixed to the centre disk by two or more bolts. The method of connection works satisfactory at relative low water pressures, but fatigue problems in the bolt connection has been experienced when higher water pressures are utilized.

In order to overcome the fatigue problem, the turbine runner has been forged to shape as one part, where after the buckets are machined and grinded to shape. It is obvious that such a method of production is relatively costly.

Under conditions where the water is contaminated, typically by sand, increased wear on the buckets is experienced. Such wear damages may be repaired by welding. Welding induces heat and thus stress to the material, which without proper heat treatment may lead to cracks. When heat treatment to overcome such problems is carried out, it is likely that the relatively close geometric tolerances of the turbine runner are disturbed.

If other processes for preparing the buckets, such as powder coating are included, it is not possible to reach all part of the wear surfaces of the bucket with the necessary equipment at right angles when the buckets are fixed to the centre disk.

U.S. Pat. No. 322,857 shows a wheel disc for a turbine runner, where a number of buckets are replaceably connected to the wheel disc, and where the buckets are supported in the tangential direction by support members extending from the disc.

The purpose of the invention is to overcome or reduce at least one of the disadvantages of the prior art.

The purpose is achieved according to the invention by the features as disclosed in the description below and in the following patent claims.

There is provided a bucket connection for a turbine runner where the turbine includes a number of buckets encircling a centre disk, wherein at least one bucket is pivotably or hingedly connected to the centre disk.

The bucket may be connected to the centre disk by one pin.

The term "pivotably" is understood to include a connection when the bucket is connected to the centre disk by one pin, the term pin including a bolt, a shaft, a tube or similar objects, while the term "hingedly" also includes a connection where for instance a part of the bucket is abutting a part of the centre disk in the radial direction of the centre disk.

As the bucket may pivot or hinge relative to the centre disk, many of the forces acting in a fixed connection between the bucket and the centre disk are avoided. It is substantially less complicated to calculate the forces acting in a connection where the bucket may adjust its position relatively to the centre disk.

The centrifugal forces acting on the buckets are keeping the bucket in the correct position during operation.

The position of the bucket relatively the centre disk under operation may be set by an abutment between the bucket and a support where the support is connected to or constitutes a part of the centre disk.

The support and the bucket may both be provided with abutment surfaces constituting the abutment. The abutment surfaces may be non-planar so that the abutment can accommodate forces acting both tangentially and radially on the bucket.

Thus the position of the bucket relatively the centre disk will be unchanged by the force acting from a jet of water.

A connection axis of the bucket may be positioned on the running direction side of the bucket relatively a first line passing through the centre axis of the runner and a mass centre of the bucket. A distance between the connection axis and the first line is termed "a" in the special part of the description.

The connection axis is the pivot or hinge axis of the bucket. Said position causes the centrifugal force to bias the bucket towards the abutment.

A surface of the abutment may be positioned at a relative position and angle relative the connection axis as to give a favourable load pattern in the centre disk as well as in the buckets.

A stopper may be provided. The stopper that is fixed to the centre disc, may be positioned on the opposite side of the bucket relatively the abutment. Alternatively the stopper may be positioned in a bore in the interface between the centre disk and each bucket. The function of the stopper is to limit the pivotal or hinged movement of the bucket particularly during standstill and start-up.

The proposed bucket connection overcomes a number of the drawbacks experienced on one-piece turbine runners working under relatively high water pressure and when the water is contaminated.

Further, the bucket may be broader at a portion above the support than at the distal end. The increased width of the bucket at a working area of a jet of water is beneficial for strengthening the buckets, and thus increasing their lifetime.

Designing the components included is relatively simple as the forces acting in such a simple connection are well understood.

Each bucket may be removed from the centre disk for exchange and repair without having to heat treat the whole turbine runner. The cost of producing the runner is substantially lower than the production cost of a one-piece turbine runner of the same size.

Below, an example of a preferred device is explained under reference to the enclosed drawings, where:

Figure 1:
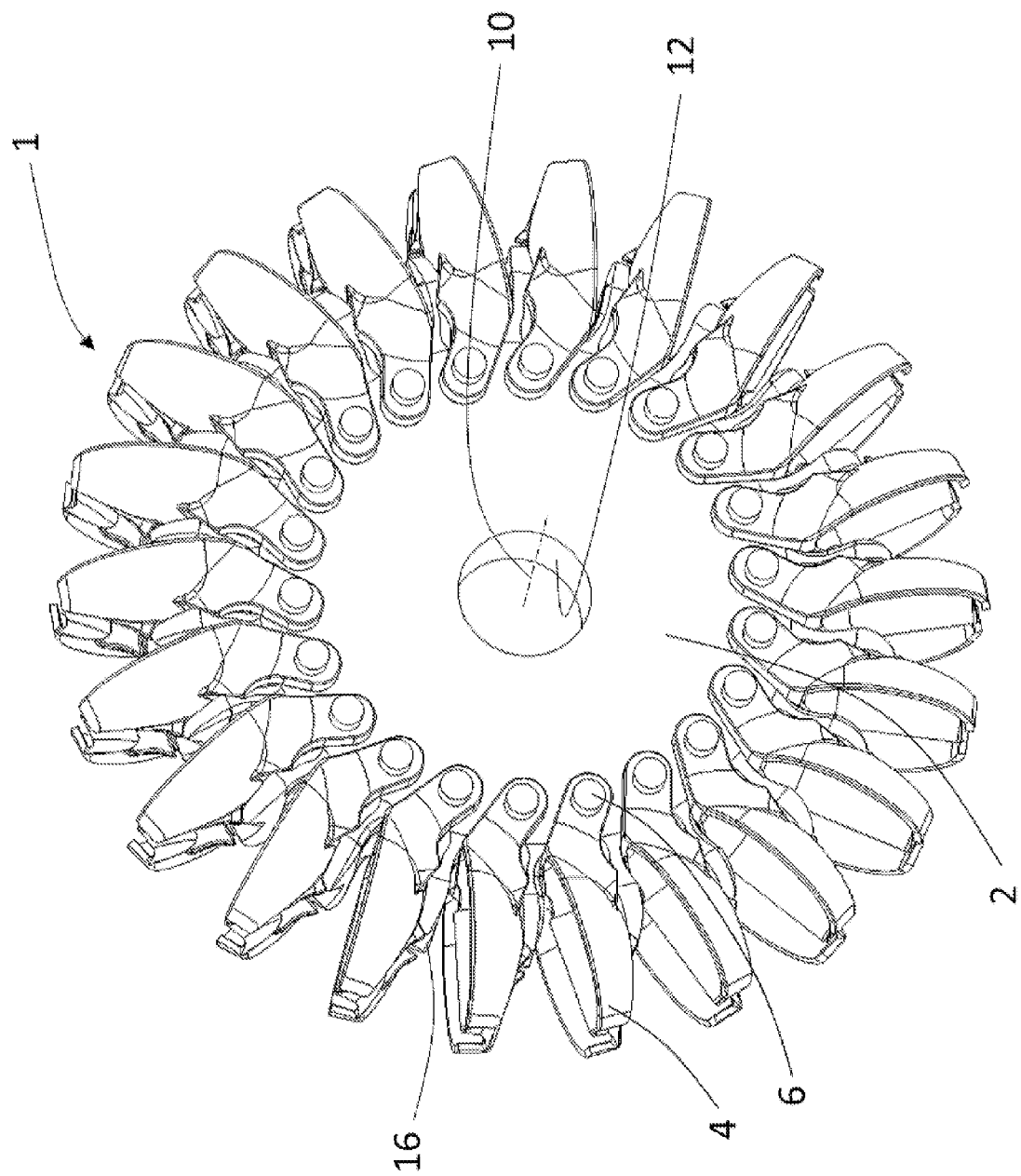
FIG. 1 shows a perspective view of a turbine runner according to the present invention.

On the drawings the reference number 1 denotes a turbine runner including a centre disk 2 and a number of buckets 4 distributed around the centre disk 2. Each bucket 4 is connected to the centre disk by one pin 6 where a centre axis of the pin 6 constitutes a connection axis 8 between the centre disk 2 and the bucket 4. The connection axis 8 is substantially parallel to a centre axis 10 of the turbine runner 1.

Figure 2:
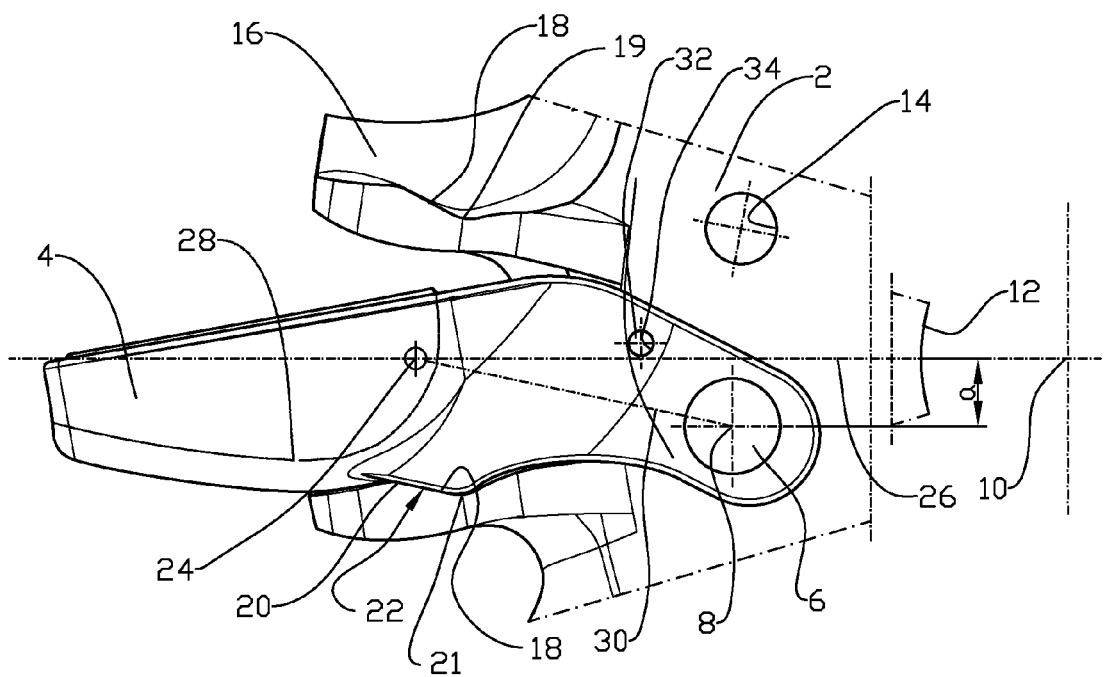
FIG. 2 shows a side view of a bucket and part of a centre disk.

The centre disk 2 is designed to be mounted on a shaft, not shown, passing through a central bore 12 of the centre disk 2. The centre disk 2 is provided with a pin bore 14 for each bucket 4. In this preferred embodiment the bucket 4 is connected to the centre disk 2 by the pin 6 passing through the actual pin bore 14 of the centre disk 2 and through corresponding, not shown, bores in the bucket 4. In FIG. 2 the pin 6 is shown with a larger diameter than the pin bore 14. This is due to the fastening method of the pin that is known to a person skilled in the art and is not discussed here.

The centre disk 2 includes a number of supports 16 in the form of protrusions that extends in a radial direction between each pair of buckets 4 from the centre disk 2. Each support 16 has at least one abutment surface 18.

The abutment surface 18 on the support 16 is non-planar in that it is provided with a buckling 19. The abutment surface 18 thus has both a tangential and a radial component.

Each bucket 4 also has an abutment surface 20 that together with a corresponding abutment surface 18 of the centre disk 2 forms an abutment 22. The abutment surface 20 of each bucket is provided with an inverse buckling 21 fitted to the abutment surface 18 of the support 16. The abutment 22 is thus adapted to accommodate both tangential and radial forces acting on the buckets 4.

The bucket 4 has a mass centre 24 as shown in FIG. 2. The connection axis 8 is positioned at a distance "a" from a first line 26 passing through the centre axis 10 of the runner 1 and the mass centre 24 of the bucket 4. Typically the connection axis 8 is positioned on the opposite side relatively the first line 26 to a working surface 28 of the bucket 4.

Stoppers 32, here in form of cylindrical members, which are positioned in bores 34 extending through the buckets 4 and into the centre disk 2, are preventing the bucket 4 from pivoting too much about the pin 6 particularly during start-up.

When in operation, the bucket 4 is biased about the connection axis 8 to the abutment surface 18 of the centre disk 2 by the centrifugal force. When a jet of water, not shown, is working on the working surface 28 of the bucket 4, the bucket 4 is further forced towards the abutment surface 18.

Figure 3:
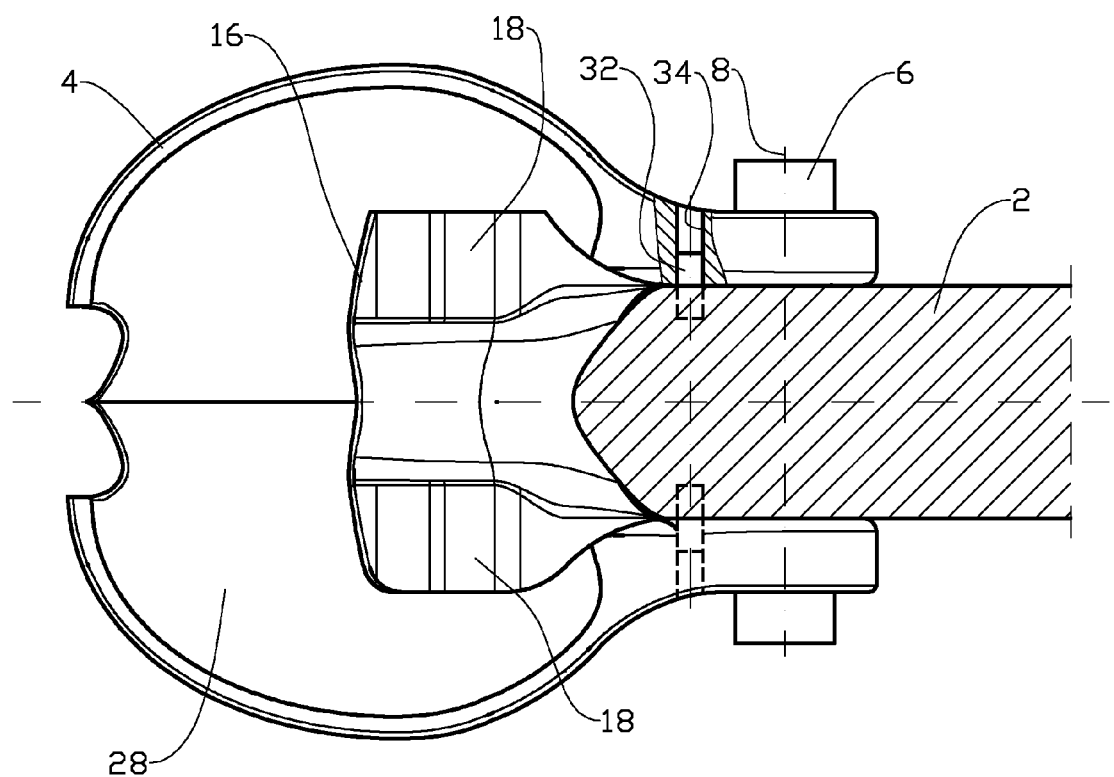
FIG. 3 shows a plane view of the bucket and the centre disk in FIG. 1.

As can be seen in the plane view of FIG. 3; the buckets 4 are somewhat heart-shaped in the shown embodiment. The buckets 4 are broadening from the distal end towards the centre disc 2, to a maximum over the abutment surface 18 of the support 16, and then narrowing in towards the connection axis 8. The increased width of the working surface 28 at the area of attack of a not shown jet of water increases the strength and thus the lifetime of buckets 4.

The invention claimed is:

1. A bucket connection for a turbine runner where the turbine runner includes a number of buckets encircling a centre disk, where at least one bucket is pivotably or hingedly connected to the centre disk, and where the position of the bucket relatively the centre disk under operation is set by an abutment between the bucket and a support, where the support is connected to or constitutes a part of the centre disk, and where the abutment is constituted by an abutment surface on the support and an abutment surface on the bucket 4, wherein the abutment surface on the support is non-planar, in that it is provided with a buckling, and that the abutment surface of the bucket is provided with a buckling adapted to fit into the buckling of the abutment surface of the support, whereby the abutment is adapted to accommodate forces acting both tangentially and radially of the bucket.

2. The bucket connection according to claim 1, wherein the bucket is connected to the centre disk by one pin.

3. The bucket connection according to claim 1, wherein a connection axis of the bucket is positioned on the running direction side of the bucket relatively a first line passing through the centre axis of the turbine runner and a mass centre of the bucket.

4. The bucket connection according to claim 1, wherein a stopper that is fixed to the centre disk is positioned on the opposite side of the bucket relatively the abutment.

5. The bucket connection according to claim 1, wherein the bucket is broader at a portion above the support than at the distal end.

* * * * *